(12) United States Patent
Sarmadi et al.

(10) Patent No.: US 9,416,925 B2
(45) Date of Patent: Aug. 16, 2016

(54) LIGHT EMITTING APPARATUS

(71) Applicant: Permlight Products, Inc., Tustin, CA (US)

(72) Inventors: Kamran Sarmadi, Arcadia, CA (US); Tom Brooks, Carlsbad, CA (US)

(73) Assignee: Permlight Products, Inc., Tustin, CA (US)

( * ) Notice: Subject to any disclaimer, the term of this patent is extended or adjusted under 35 U.S.C. 154(b) by 0 days.

(21) Appl. No.: 14/083,334

(22) Filed: Nov. 18, 2013

(65) Prior Publication Data

US 2014/0139108 A1 May 22, 2014

Related U.S. Application Data

(60) Provisional application No. 61/727,415, filed on Nov. 16, 2012, provisional application No. 61/758,194, filed on Jan. 29, 2013.

(51) Int. Cl.

| | |
|---|---|
| *F21V 7/00* | (2006.01) |
| *F21K 99/00* | (2016.01) |
| *H05B 33/08* | (2006.01) |
| *F21S 8/06* | (2006.01) |
| *F21V 13/12* | (2006.01) |
| *F21V 25/10* | (2006.01) |
| *F21V 3/04* | (2006.01) |

(Continued)

(52) U.S. Cl.
CPC ... *F21K 9/50* (2013.01); *F21S 8/06* (2013.01); *F21V 7/00* (2013.01); *F21V 7/0016* (2013.01); *F21V 13/12* (2013.01); *H05B 33/0803* (2013.01); *H05B 33/0812* (2013.01); *F21K 9/00* (2013.01); *F21V 3/049* (2013.01); *F21V 5/04* (2013.01); *F21V 7/05* (2013.01); *F21V 7/22* (2013.01); *F21V 9/16* (2013.01); *F21V 17/12* (2013.01); *F21V 23/008* (2013.01); *F21V 25/10* (2013.01); *F21V 29/713* (2015.01); *F21V 29/87* (2015.01); *F21V 29/89* (2015.01); *F21Y 2101/02* (2013.01); *F21Y 2105/001* (2013.01); *Y02B 20/343* (2013.01)

(58) Field of Classification Search
CPC .......... F21V 7/00; F21V 11/18; F21V 19/02; H05B 37/00
USPC ............. 315/113, 119, 185 R, 294, 307, 309; 362/235, 294
See application file for complete search history.

(56) References Cited

U.S. PATENT DOCUMENTS 4,280,170 A * 7/1981 Baldwin ........................ 362/224
4,472,767 A * 9/1984 Wenman ....................... 362/302
(Continued)

OTHER PUBLICATIONS

BB03 AV Series LED Module Specification Sheet, Brillia Lighting, 2009.

*Primary Examiner* — Tung X Le
(74) *Attorney, Agent, or Firm* — Klein, O'Neill & Singh, LLP (57) ABSTRACT

An LED-based luminaire is configured to direct light from an LED source downwardly. However, a portion of the luminaire intentionally reflects part of the light upwardly toward a ceiling of a structure. A control circuit of an LED-based luminaire enables the luminaire to be dimmed by an off-the-shelf dimmer. The control circuit also determines when a temperature of the LED-based luminaire exceeds a desired temperature range, and employs a feedback circuit to reduce power delivery to the LEDs until the temperature is again within the desired temperature range.

17 Claims, 5 Drawing Sheets

(51) Int. Cl.
*F21V 5/04* (2006.01)
*F21V 7/05* (2006.01)
*F21V 7/22* (2006.01)
*F21V 9/16* (2006.01)
*F21V 17/12* (2006.01)
*F21V 23/00* (2015.01)
*F21Y 101/02* (2006.01)
*F21Y 105/00* (2016.01)
*F21V 29/71* (2015.01)
*F21V 29/87* (2015.01)
*F21V 29/89* (2015.01)

(56) References Cited

U.S. PATENT DOCUMENTS

| | | | |
|---|---|---|---|
| 5,791,768 A * | 8/1998 | Splane, Jr. | F21V 7/0025 362/280 |
| 6,076,936 A | 6/2000 | George | |
| 6,082,870 A | 7/2000 | George | |
| 6,116,748 A | 9/2000 | George | |
| 6,273,590 B1 * | 8/2001 | Splane, Jr. | F21S 8/04 362/281 |
| 6,416,200 B1 | 7/2002 | George | |
| 6,578,986 B2 | 6/2003 | Swaris et al. | |
| 6,712,486 B1 | 3/2004 | Popovich et al. | |
| 6,846,093 B2 | 1/2005 | Swaris et al. | |
| 6,874,914 B2 * | 4/2005 | Desanto | F21S 8/04 362/256 |
| 7,038,399 B2 | 5/2006 | Lys et al. | |
| 7,102,172 B2 | 9/2006 | Lynch et al. | |
| 7,108,396 B2 | 9/2006 | Swaris et al. | |
| 7,114,831 B2 | 10/2006 | Popovich et al. | |
| 7,116,052 B2 | 10/2006 | Ito et al. | |
| 7,252,408 B2 | 8/2007 | Mazzochette et al. | |
| 7,306,353 B2 | 12/2007 | Popovich et al. | |
| 7,329,024 B2 | 2/2008 | Lynch et al. | |
| 7,387,406 B2 | 6/2008 | Swaris et al. | |
| 7,470,044 B2 * | 12/2008 | Maes | F21V 11/18 362/16 |
| 7,518,320 B2 | 4/2009 | Chen et al. | |
| 7,582,911 B2 | 9/2009 | Lynch et al. | |
| 7,594,740 B2 | 9/2009 | Popovich et al. | |
| 7,649,327 B2 | 1/2010 | Peng | |
| 7,741,825 B2 | 6/2010 | Lenz | |
| 7,815,341 B2 | 10/2010 | Steedly et al. | |
| 7,918,591 B2 | 4/2011 | Lynch | |
| 7,939,837 B2 | 5/2011 | Lynch et al. | |
| 8,111,011 B1 | 2/2012 | Tu et al. | |
| 8,143,805 B2 | 3/2012 | Peng | |
| 8,186,850 B2 | 5/2012 | Popovich et al. | |
| 8,198,642 B2 | 6/2012 | Wang et al. | |
| 8,220,961 B2 | 7/2012 | Belknap et al. | |
| 8,246,205 B2 | 8/2012 | Lai | |
| 8,264,155 B2 | 9/2012 | Negley et al. | |
| 8,264,806 B2 | 9/2012 | Gehrke | |
| 8,274,237 B2 | 9/2012 | Nagase et al. | |
| 8,310,171 B2 | 11/2012 | Reisenauer et al. | |
| 2008/0130288 A1 * | 6/2008 | Catalano et al. | 362/294 |
| 2009/0296384 A1 * | 12/2009 | Van De Ven et al. | 362/231 |
| 2011/0068701 A1 * | 3/2011 | van de Ven et al. | 315/185 R |
| 2011/0085331 A1 * | 4/2011 | Kotovsky | F21S 6/007 362/235 |
| 2011/0317412 A1 * | 12/2011 | Paik et al. | 362/235 |
| 2012/0081007 A1 | 4/2012 | Sun et al. | |
| 2012/0081008 A1 | 4/2012 | Chen et al. | |
| 2012/0112638 A1 | 5/2012 | Melanson et al. | |
| 2012/0146548 A1 | 6/2012 | Campbell et al. | |
| 2012/0299481 A1 | 11/2012 | Stevens | |
| 2013/0163248 A1 | 6/2013 | Lynch et al. | |
| 2014/0085883 A1 * | 3/2014 | Douglas | F21V 29/77 362/235 |

* cited by examiner

LIGHT EMITTING APPARATUS

CROSS-REFERENCE TO RELATED APPLICATIONS

The application is based on and claims priority to U.S. Provisional Application Nos. 61/727,415, which was filed Nov. 16, 2012, and 61/758,194, which was filed Jan. 29, 2013. The entirety of each of these priority applications is hereby incorporated by reference.

FEDERALLY SPONSORED RESEARCH OR DEVELOPMENT

Not Applicable.

BACKGROUND

The present disclosure relates to the field of lighting, and more particularly to luminaires employing light emitting diodes (LEDs), and methods of controlling such LED-based luminaires.

LED-based luminaires have been gaining increased acceptance as the efficiency and long-life of LEDs becomes better known. However, LEDs behave differently than many other types of light source. For example, in contrast to traditional incandescent lamps, which emit light generally around 360° from the light source, LEDs typically are provided in "packages" that include a focusing element that directs light over a limited direction range, such as 120°. Also, LED-based luminaires typically include several individual LED packages mounted on a circuit board. The physical aspects and behavior of LED packages create new challenges for some lighting applications.

The long-life benefits of LEDs are best cu aced by controlling the heat to which LEDs are exposed, as excessive heat can decrease the brightness and working life of LEDs. Thus, LED-based luminaires often have heat management structures that evacuate heat from the LEDs in order to maintain the heat within a desired range. However, LED-based luminaires may be used in a wide range of applications and environments. Some heat management structures may not be sufficient to maintain the LEDs within a desired range of heat if the surrounding environment is too warm, or if other factors decrease the efficacy of the heat management structure.

SUMMARY

There is a need in the art for LED-based luminaires having structure that manages the light emitted by the LEDs in such a manner to produce a pleasing visual lighting effect.

There is also a need in the art for LED-based luminaires that can identify a risk that its LEDs could overheat, and automatically compensate to protect its LEDs from overheating.

In accordance with one embodiment, the present invention provides a luminaire for indoor use. The luminaire comprises an LED module having a plurality of LEDs, and is configured so that the LEDs of the LED module are positioned to direct light generally downwardly towards a floor. The luminaire further comprises a redirecting member disposed generally below the LED module so that a portion of light from the LEDs impinges on the redirecting member. A portion of light from the LEDs is redirected by the redirecting member upwardly toward a ceiling.

In one such embodiment, the redirecting member is ring-shaped and spaced downwardly and radially outwardly from the LED module. In some embodiments, the ring member has a graphical theme disposed on a side visible from the floor.

In some such embodiments, the luminaire comprises an outer housing, and the redirecting member is supported independent of the outer housing.

In some embodiments the redirecting member is removable independently of the outer housing.

In accordance with another embodiment, an LED-based luminaire comprises a circuit board with a power circuit disposed thereon. A plurality of LED packages are mounted on the circuit board so as to be powered by the power circuit. A power driver is adapted to provide a power flow across the power circuit, and has a feedback input. The power driver is configured to vary the power delivered to the power circuit depending upon a feedback voltage at the feedback input. The LED module has a feedback circuit connected to the power driver feedback input. At least one thermistor is mounted on the LED module. The feedback circuit comprises a voltage divider comprising the at least one thermistor and a resistor. A shunt regulator is connected between the at least one thermistor and the resistor. The resistance of the at least one thermistor changes as heat in the LED module changes. When the thermistor resistance passes a trigger value, the shunt regulator is triggered to change the feedback voltage so as to signal the power driver to change the amount of power delivered across the power circuit.

Some such embodiments comprise a plurality of thyristors arranged electrically in series.

In some embodiments, the at least one thyristor declines in resistance as the temperature rises, and the shunt regulator reduces the feedback voltage as the thyristor resistance declines beyond a trigger resistance. Decreasing the feedback voltage signals the power driver to decrease power delivery across the power circuit.

In additional embodiments, the feedback circuit is on board the LED module circuit board, and the feedback circuit is powered by housekeeping power from the power circuit.

Further embodiments additionally comprise a thyristor-based dimmer attached between the feedback circuit and the power driver feedback input so as to enable manual adjustment of the feedback voltage. The feedback circuit and thyristor-based dimmer are operable separately and simultaneously.

In accordance with another embodiment, an LED-based luminaire comprises a circuit board with a power circuit disposed thereon, a plurality of LED packages mounted on the circuit board so as to be powered by the power circuit, and a power driver adapted to provide a power flow across the power circuit. The power driver has a feedback input, and the power driver is configured to vary the power delivered to the power circuit depending upon a feedback voltage at the feedback input. The LED module has an on-board thermal control subcircuit on the circuit board, which thermal control subcircuit is adapted to automatically vary the feedback voltage depending on a temperature sensed by the thermal control subcircuit. A manual dimming module is interposed between the thermal control subcircuit and the feedback input of the power driver. The manual dimming module is configured to allow an operator to manually change the feedback voltage. The thermal control subcircuit is operable independent of the manual dimming module.

DESCRIPTION

This specification and figures present and discuss non-limiting embodiments of a luminaire having a plurality of light emitting diodes (LEDs) for providing illumination. Certain inventive principles discussed herein have to do with physical aspects of the illustrated luminaire. Certain other inventive principles discussed herein have to do with electrical circuitry. It is to be understood that the specific embodiments discussed herein are for illustrative purposes only, and that other types and shapes of luminaires can employ inventive principles in connection with the physical and/or electrical principles discussed herein.

Figure 1A:
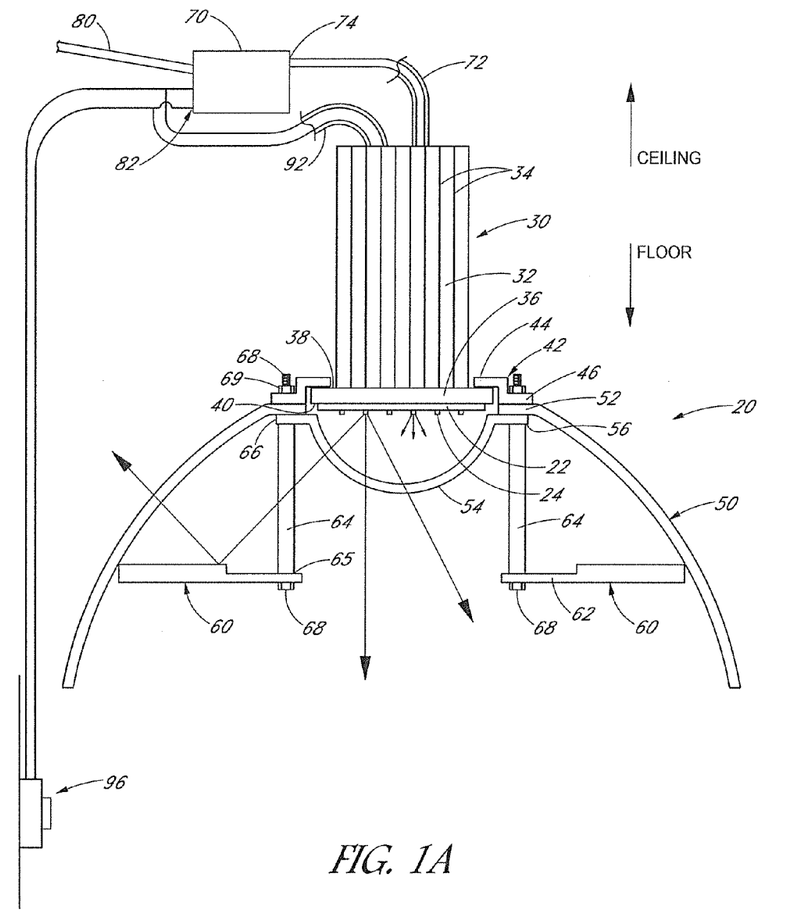
FIG. 1a shows a side section view of a high-bay luminaire embodiment having features of the present disclosure, and showing certain components schematically.
Figure 1B:
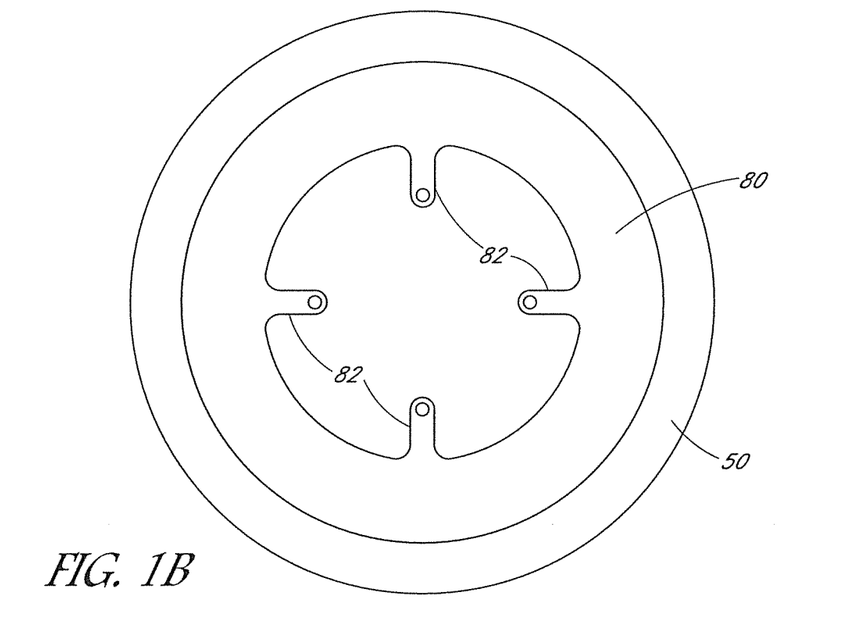
FIG. 1b is a bottom view of an outer housing and ring of the luminaire of FIG. 1.
Figure 1C:
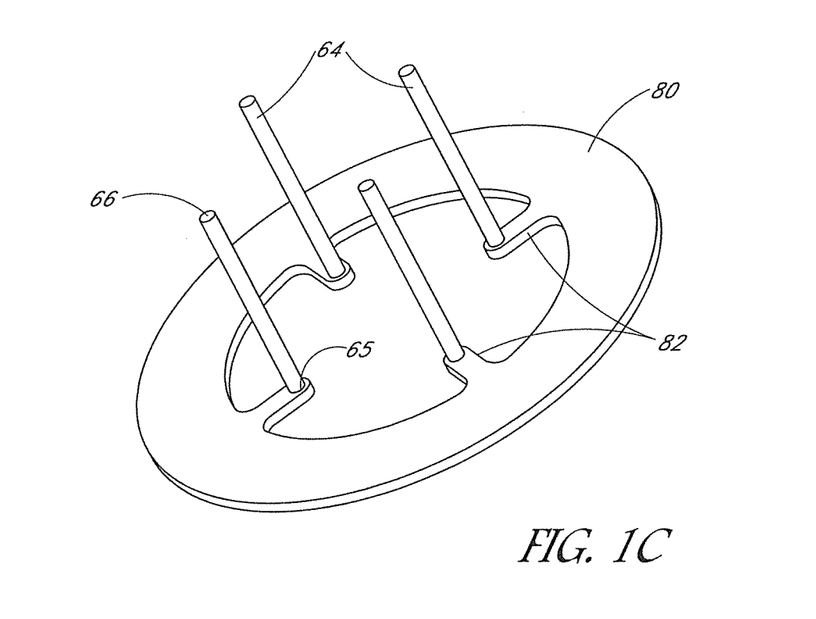
FIG. 1c is a perspective view of a ring embodiment having features of the present disclosure.
Figure 2:
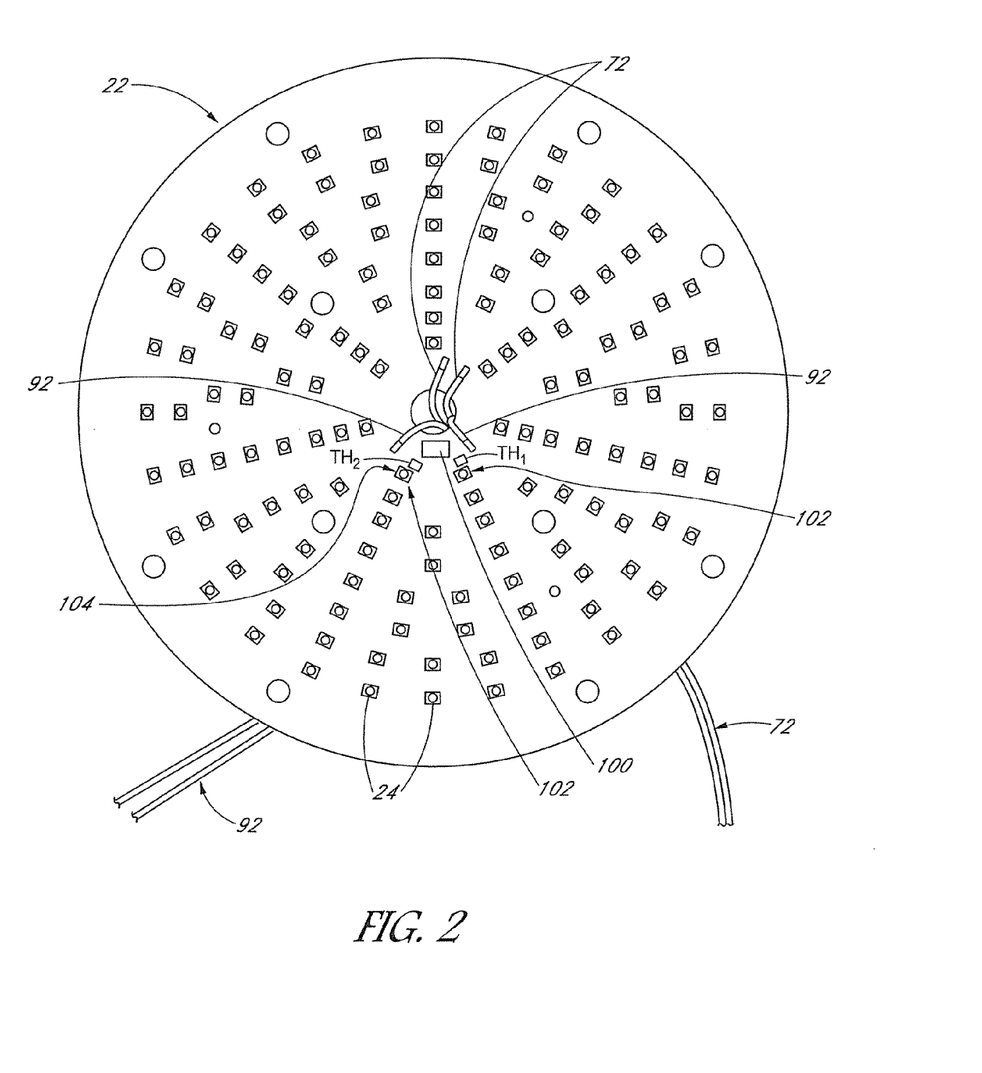
FIG. 2 is a schematic view of a circuit board embodiment for use in the high-bay luminaire of FIG. 1.
Figure 3:
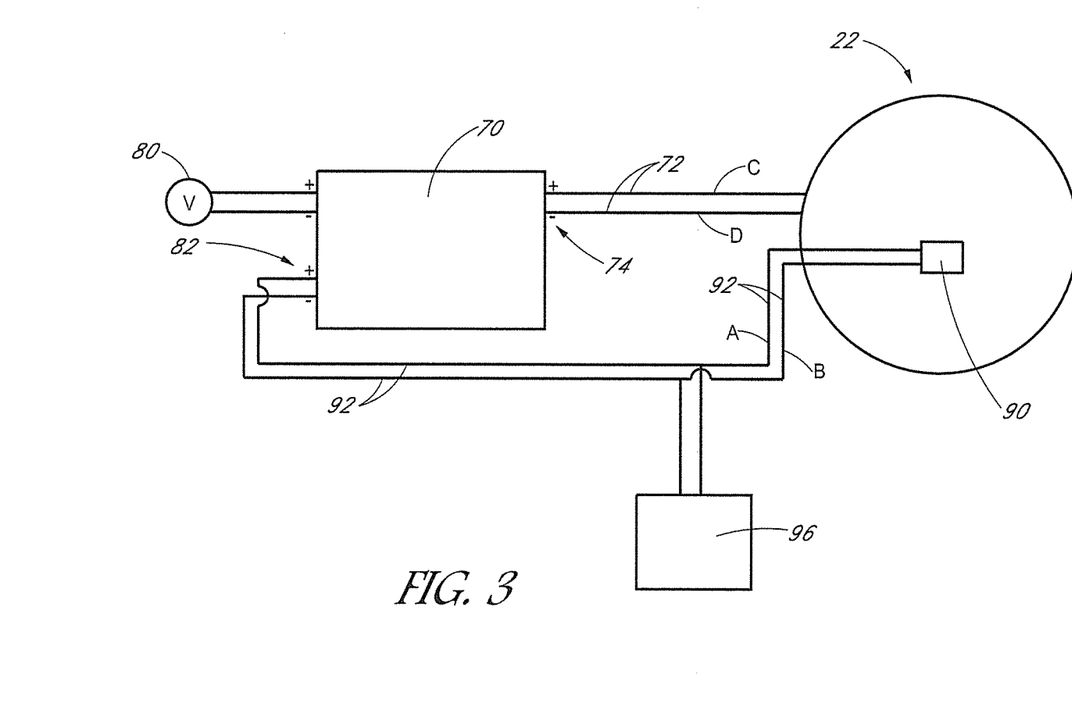
FIG. 3 is a schematic representation of electric components of the high-bay luminaire of FIG. 1.

With reference to FIGS. 1-3, an embodiment of a light emitting apparatus is illustrated. The illustrated embodiment is a "high-bay"-type luminaire 20 often used for warehouses, factories, high-ceilinged buildings, and the like. Of course, the principles and structure discussed herein can be applied to other lighting applications and structures, and the present embodiment is for illustration purposes.

In the illustrated embodiment, the light emitting apparatus 20 has an eight inch diameter LED module 22, as shown in FIG. 2, having a power circuit 23 with one hundred forty individual LED packages 24 that can emit light. The LED packages 24 in the illustrated embodiment emit light in a range of directions less than 180°. It is understood that, in other embodiments, the LED module 22 can be of various sizes or shapes and can have any number of LEDs and other electrical componentry in the circuit. Further details of the electrical componentry on the LED module 22 in some embodiments will be discussed below.

The illustrated embodiments employ an LED module 22 that comprises a metal core circuit board having a plurality of LEDs (and, in some embodiments, other componentry) mounted thereon. Some embodiments of metal core circuit boards have advantageous heat management properties that may be helpful in the illustrated embodiments. It is to be understood, however, that there are various ways of configuring circuit boards, and multiple types and configurations of circuit boards (including FR4-based boards and others) for use in connection with LED modules. Applicants refer US Pub. No. US2010/0226139, entitled "LED-based Light Engine", U.S. Pat. No. 7,939,837, entitled "LED Luminaire", U.S. Pat. No. 7,918,591, entitled "LED-based Luminaire", which present several embodiments of circuit boards and LED module constructions and configurations. Each of these reference publications are hereby incorporated by reference in their entirety. Also, it is to be understood that substantially any type of LED module can be used in accordance with principles discussed in connection with the present disclosure.

With particular reference to FIG. 1a, an embodiment of a luminaire is illustrated. In this embodiment, the LED module 22 is mounted so that a back side of the module is attached to a heat sink 30. The heat sink 30 preferably has a heat sink body 32 which may, as shown in the illustrated embodiment, have fins 34 to help communicate heat to the environment. In the illustrated embodiment, the heat sink 30 includes a heat sink flange 36 at which the heat sink 30 increases in diameter relative to the heat sink body 32. The heat sink flange 36 has an upper surface 38 and a lower surface 40. The LED module 22 is attached to the lower surface 40 of the heat sink flange 36. The heat sink 30 may be hollow so as to accommodate wires extending therethrough and to the LED module 22.

It is to be understood that the heat sink 30 can be made of any of several materials appropriate for this purpose. For example, in one embodiment, the heat sink 30 comprises aluminum. In other embodiments, the heat sink can also or instead comprise a directional heat transfer material, such as carbon nanotubes. Further, the heat sink may comprise a single block of material or may comprise two or more pieces of material that are attached through direct surface-to-surface contact with or without a thermal interface material (TIM). Further, various shapes and sizes of heat sinks may be employed. Additionally, preferably a mounting structure is provided to attach the luminaire so as to be hung from a ceiling, in any known or preferred manner.

A mount 42 preferably is generally circular in shape and has a first mount flange 44 and a second mount flange 46. In the illustrated embodiment, the first mount flange 44 fits above and rests upon the upper surface 38 of heat sink flange 36. The second mount flange 46 provides an attachment point for other components of the luminaire 20. For example, in the illustrated embodiment, an outer housing 50 is attached to the second mount flange 46 at a housing flange portion 52. The illustrated outer housing 50 is a generally hemispherically-shaped dome. Other shapes and sizes of outer housings may also be employed, and in some embodiments, no outer housing may be employed. The outer housing 50 can be clear, opaque, partially opaque, translucent, frosted, or the like, and can be made of various materials including, for example, acrylic, glass, and ceramic.

With continued reference to FIG. 1a, in the illustrated embodiment, a generally dome-shaped second housing, or lens 54, generally encircles the LED module 22 and encloses the LED module 22 so that the module cannot be accessed or touched when the lens 54 is in place. In the illustrated embodiment, the lens 54 includes a lens mount flange 56 that cooperates with the outer housing flange 52 and/or second mount flange 46 to hold the lens 54 in place. In the illustrated embodiment, the lens/second housing 54 is dome-shaped and clear, although it should be understood that it can have various shapes and sizes and can be made of various materials and colors, and also may have varying levels of opacity. In some embodiments, the lens 54 is frosted in order to aid dispersion or diffusion of light from the LEDs at different angles to illuminate the area below the luminaire. In some embodiments, the lens 54 may be adapted to reflect a portion of light emitted by the LEDs upwards or towards the ceiling, resulting in what is referred to as "backlighting." In still other embodiments, the lens 54 may include optical elements to direct light from the LEDs in desired directions.

With continued reference to FIG. 1a, light emitted by the LEDs is directed generally downwardly toward the floor. This may result in a condition in which the ceiling of the associated building is relatively dark, even if the floor is well-lit. Some people find this effect to be unappealing from a visual aesthetic level, and wish at least some light to be directed toward the ceiling.

With additional references to FIGS. 1b and 1c, preferably a ring 60 is spaced downwardly from the LED module 22 and generally radially outwardly from the LEDs on the module. In the illustrated embodiment, the ring 60 generally tracks and is placed adjacent to the outer housing 50. The illustrated ring 60 comprises a plurality of tabs 62 that extend radially inward. A corresponding plurality of elongate stand-offs 64 are attached directly or via other structures, such as the lens mount flange 56, to the second mount flange 46. These stand-offs 64 are connected to the tabs 62, and thus, the ring 60 is supported from above. The stand-offs 64 preferably have first and second ends 65, 66. The first ends 65 are attached and mounted generally above the ring 60 and, in the illustrated embodiment, adjacent the LED module 22. The second ends 66 of the stand-offs 64 are attached to the tabs 62 on the ring 60.

In some embodiments, the ring is releasably attached to the stand-offs 64, so that the rings can be replaced independent of other components of the luminaire. In the illustrated embodiment, the stand-offs 64 are hollow, and each accommodates a bolt 68 extending therethrough. As such, a bolt 68 and nut 69 combine to simultaneously hold the ring 60, stand-off 64, lens flange 56, housing flange 52 and second mount flange 46 together as an assembly, which assembly hangs from the upper surface 38 of the heat sink flange 36.

In the illustrated embodiment, the ring 60 is generally disc-shaped, matching the illustrated outer housing 50. It is to be understood, however, that in other embodiments the ring 60 can have various shapes, including symmetrical and non-symmetrical shapes, square or rectangular shapes, or other geometric shapes. Further, it is to be understood that a luminaire having features as discussed herein may or may not include one or more of the ring 60, outer housing 50, or second housing/lens. For example, another embodiment may include a second housing/lens and a ring, but no outer housing. Additional embodiments may include an outer housing and second housing/lens but no ring, and further embodiments may employ a ring but no outer or second housing. Further combinations are also contemplated.

In some embodiments the ring 60 can be attached or, in other embodiments, coformed with the outer housing 50. In such embodiments, standoffs may be unnecessary, or may be employed for additional support or even as a structure for supporting the entire outer housing 50. Also, in additional embodiments a portion, or window, of the outer housing 50 immediately above the ring 60 may be clear, or at least more conducive to direct light travel therethrough than the rest of the outer housing 50, so as to accommodate reflection of a portion of light by the ring 60 towards the ceiling.

With continued reference to FIGS. 1a-c, the ring 60 can be made of various materials and can be transparent, translucent, have variations in opacity, be shiny, frosted, reflective, or the like. Preferably, an upper surface of the ring 60 generally faces the LED module 22, and some light from the LEDs directly impinges on the upper surface of the ring 60. Preferably, the ring 60 reflects a portion of light generally upwardly so as to provide some measure of illumination to the ceiling area. In some embodiments all light that contacts the upper surface of the ring 60 is reflected; in other embodiment only a portion of light is reflected, and a portion passes through the ring 60. However, preferably, the majority of light from the LED module 22 is directed generally downwardly to illuminate the floor.

In the illustrated embodiment, the disc or ring 60 is ⅛" thick acrylic. Of course, the ring 60 can be various widths and thicknesses. In addition, in other embodiments, the ring 60 can have various colors. For example, it may be made of a colored acrylic, or a material that has been embedded with phosphorous to provide a glowing or fluorescent effect. Further, in other embodiments, the ring or disc can be customized by adding, adhering or applying graphics and/or artwork to the ring 60 that can enhance the visual effect of the luminaire.

The percentage of light reflected by the ring 60, thus creating a backlight, can be adjusted or controlled, depending on the surface area of the ring 60, as well as the material and treatments that the ring 60 employs. For example, a larger-diameter ring 60 having a smaller aperture will reflect a greater percentage of illuminated light as backlight than a smaller-diameter ring with a larger aperture. Additionally, an embodiment having a portion of the ring upper surface covered with a reflective material may create more backlight than a translucent or light-absorbent material.

Figure 4:
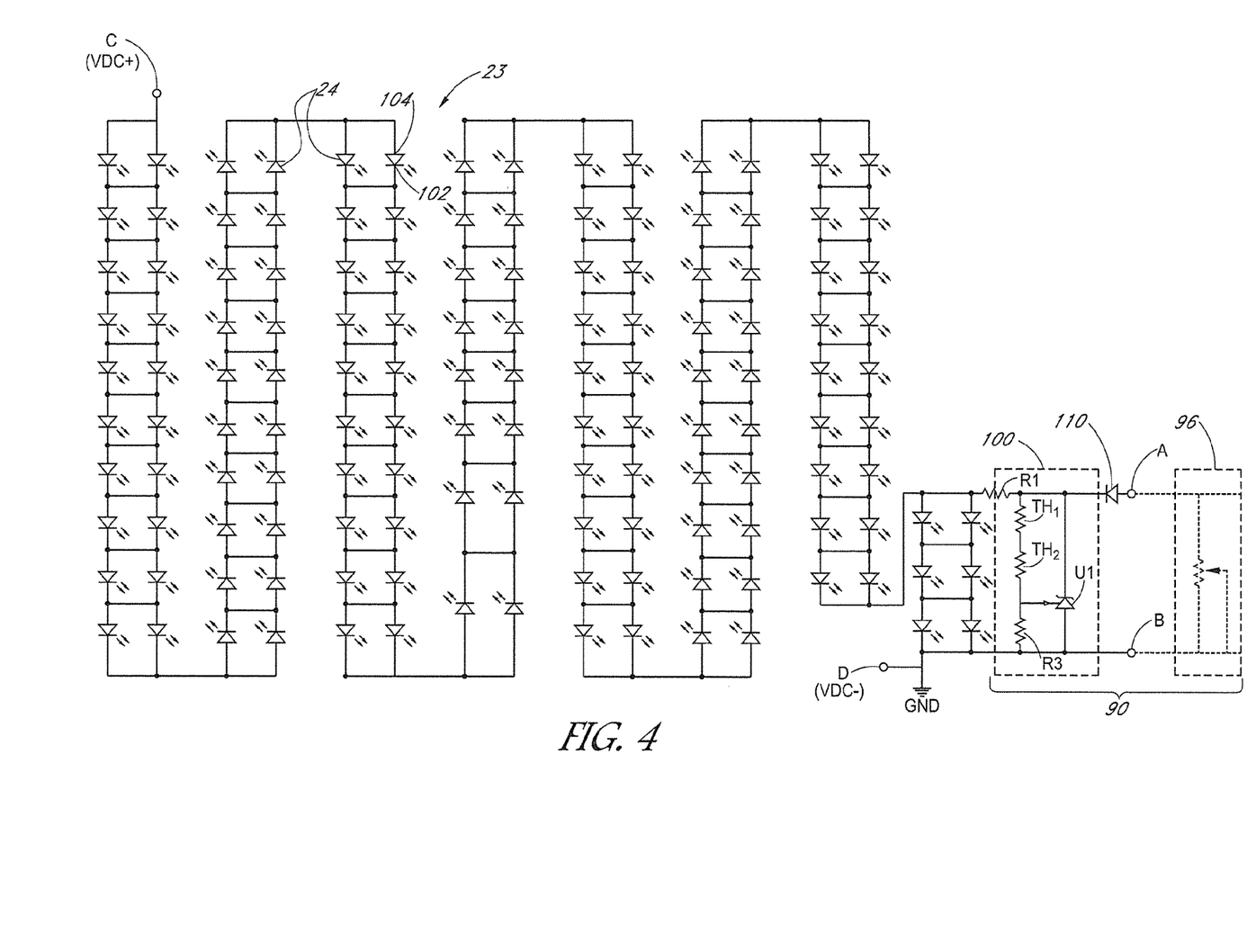
FIG. 4 is a schematic representation of a circuit embodiment of the luminaire of FIG. 1.

With continued reference to FIGS. 1-3, and additional reference to FIG. 4, preferably an array of prepackaged LEDs is 24 mounted on the LED module 22. In the illustrated embodiment, the array includes 140 LEDs. Seventy pairs of LEDs are arranged electrically in parallel. The pairs are arranged in series relative to the other pairs. In the illustrated embodiment, each of the LEDs 24 has a voltage drop of about 3.3 volts.

In the illustrated embodiment, power is provided to the LED module 22 by an input power driver 70, and power wires 72 extend from the DC outputs 74 of the power driver 70 to the luminaire. The driver 70 accepts an AC input 80 which, in the illustrated embodiment, is 120 VAC. The DC output 74 is applied across points C and D of the LED module circuit, and preferably supplies a constant current. Preferably, the power supply is dimmable. In the illustrated embodiment, the power supply follows IEC60929 annex E.2, in which a feedback voltage of between 0-10 volts applied across feedback connections 82 signals the driver 70 when and how much to reduce the current supplied to the circuit.

The LED module 22 includes a feedback circuit 90 from which feedback wires 92 extend back to the driver 70, connecting to the feedback connections 82 of the driver 70. The feedback circuit 90 is configured to apply a voltage between 0-10 volts between points A and B. In the illustrated embodiment, the driver 70 will proportionally reduce current supply based upon the feedback voltage, which reduction has the effect of dimming the LEDs 24 on the LED module 22. In the illustrated embodiment, a feedback voltage of 10 volts corresponds to full brightness (and maximum current), and a feedback voltage of 0 volts corresponds to full dimming (minimum current). A feedback voltage between 0 and 10 volts results in proportional reduction of current from the maximum amount. It is to be understood that other embodiments may employ other specific feedback/dimming structure and methods.

As best shown in FIG. 4, in the illustrated embodiment the feedback circuit 90 uses "housekeeping" power, meaning that the voltage that spans a portion of the LED powering circuit also powers the feedback circuit 90. In the illustrated embodiment, the feedback circuit 90 spans three pairs of series-connected LED pairs. Since, in the illustrated embodiment, each LED 24 has voltage drop of about 3.3 volts, this arrangement results in a housekeeping feedback circuit 90 voltage of about 10 volts across points A and B along the feedback wires 92.

With reference again to FIGS. 1a, 3 and 4, a conventional, off-the-shelf dimmer 96, such as a wall-mounted (or otherwise-mounted) thyristor-based dimmer that can be connected across the feedback wires 92 so as to be connected across points A and B of the circuit. When manually operated, the dimmer 96 varies the feedback voltage, which in turn signals the power driver 70 to correspondly vary the supply current in order to control dimming of LEDs on the LED module 22.

With reference again specifically to FIGS. 2 and 4, in the illustrated embodiment, the feedback circuit 90 also includes a thermal control subcircuit 100. The thermal control subcircuit 100 is configured to change the feedback voltage so as to prompt lessening of the current supplied by the power driver 70 upon detecting excessive heat in the LED module 22. This will protect LEDs 24 on the module from experiencing excessive heat that would damage their efficacy and lifetime.

Preferably two thyristors ($TH_1$ and $TH_2$) are provided on the LED module 22. The thyristors are configured so that their resistance changes depending upon the sensed temperature. In the illustrated embodiment, prepackaged LEDs 24 of the LED module 22 have a cathode side 102 and an anode side 102. In the current embodiment the thyristors $TH_1$, $TH_2$ are mounted to be as close as practical to the cathode side 102 of selected LED packages 24 so that the thyristors $TH_1$, $TH_2$ are at a temperature indicative of the cathode side 102 temperature.

Certain manufacturers correlate the LED die's junction temperature relative to a temperature at the cathode side of their LED packages 24. Thus, by sensing the temperature at the cathode side of the package, one can estimate the actual junction temperature based on the manufacturer's data. Thus, to ensure the junction temperature does not exceed a level that could damage the die, such manufacturers recommend that the LED package be operated such that the cathode side temperature stays below a specified value Ts corresponding to a safe junction temperature. It is to be understood that other manufacturers may have other manners of measuring and rating their LED packages. For example, another manufacturer may direct measurement of the temperature at the anode side 102 of the LED package, or at a slug attached to the bottom of the package. As such, it is to be understood that, in other embodiments, the thermistors preferably are placed relative to the package so as to sense the relevant temperature Ts of that particular LED package.

In the illustrated embodiment, two thermistors—$TH_1$ and $TH_2$—are employed. It is to be understood, however, that in other embodiments, a single thermistor or several thermistors can be employed so as to obtain a reliable temperature Ts.

In the illustrated embodiment, the thermistors $TH_1$, $TH_2$ are NTC thermistors, in which the resistance reduces as the temperature increases. As discussed above, preferably the thermistors $TH_1$, $TH_2$ are positioned as close as practical to the cathode of respective LEDs 24 on the LED module 22. Also, preferably, the LED(s) selected for placement of the thermistors are at potentially the hottest area(s) of the module. With specific reference to FIG. 4, the thermistors $TH_1$, $TH_2$ preferably are part of a voltage divider with resistor R3 in which a shunt regulator U1 is connected between the thermistors and resistor R3. In the illustrated embodiment, U1 can be an adjustable Precision Zener Shunt Regulator, Model No. LN431AIN3, which is available from National Semiconductor Corporation.

As the sensed temperature increases, the thermistor resistance decreases, eventually reaching a low-enough value to trigger the input of the shunt regulator U1 to reach a reference value. The shunt regulator U1 will then reduce the voltage at its cathode, thus reducing the voltage across points A and B. The voltage across points A and B is, of course, the feedback voltage that signals the power driver 70 whether and how much to reduce the current in order to dim the LEDs 24 on the LED module 22. As such, if the temperature rises high enough, then the thermistors $TH_1$, $TH_2$ react in such a way as to prompt the shunt regulator U1 to reduce the feedback voltage, and the driver 70 will thus reduce the current supplied to the LEDs. Reduced current causes reduced LED brightness, which in turn reduces heat generated by each LED 24.

As the amount of heat generated by the LEDs 24 reduces, the heat as detected by the thermistors $TH_1$, $TH_2$ will eventually normalize, or stop increasing, and the resistance of the thermistors $TH_1$, $TH_2$ will correspondingly stop decreasing. Thus the shunt regulator U1 will stop decreasing the feedback voltage and further dimming of the LEDs 24 will also stop. As the heat stabilizes, and perhaps heat evacuation improves, the temperature sensed by the thermistors $TH_1$, $TH_2$ may decrease, and thus the thermistor resistance will increase, so that the shunt regulator U1 will increase the feedback voltage, signaling the driver 70 to increase the input current and thus brightening the LEDs, all at a safe temperature below the LED package manufacturer's recommended safe operating temperature Ts.

With continued reference to FIG. 4, in some embodiments a protective diode 110 can be provided to protect the power driver 70 by ensuring that any voltage remains less than 10 volts. In the illustrated embodiment a power resistor R1 is provided in series with the power delivery to the feedback circuit 90 in order to provide a safe bias voltage for the feedback circuit 90.

It is to be understood that, in a preferred embodiment, both the off-the-shelf thyristor-based dimmer 96 and the thermal control subcircuit 100 can be attached and even used at the same time. For example, an operator may use a wall-mounted dimmer 96 to manually dim the light a portion by adjusting the dimmer 96 so that the feedback voltage is about 9V. However, if the dimmed luminaire is still in an exceedingly hot condition, the thermal control subcircuit 100 may further reduce the feedback voltage, eventually stabilizing at a feedback voltage of about 7V. If the operator then adjusts the wall-mounted dimmer 96 to increase brightness (i.e. return the dimmer's control knob to a position normally associated with 10V feedback voltage), the thermal control subcircuit 100 remains in control, holding the feedback voltage at 7V. However, if the operator adjusts the wall-mounted dimmer 96 to dim further (e.g., move the dimmer's control knob to a position normally associated with, say, 5V feedback voltage), such further dimming would still be enabled. Alternatively, in other embodiments, one or the other of these dimming options may be removed without affecting the operability of the other.

The illustrated embodiment has discussed a specific design with a specific number of LEDs configured in a specific array, etc. It is to be understood that the principles discussed herein can be employed with many different LED arrays and circuits.

The embodiments discussed above have disclosed structures with substantial specificity. This has provided a good context for disclosing and discussing inventive subject matter. However, it is to be understood that other embodiments may employ different specific structural shapes and interactions. For example, other embodiments may employ other types of luminaires, such as troffers, pendant lights, or even LED modules for use within large or small illuminated signs such as channel letters.

It is also to be understood that, in other embodiments, a feedback circuit as disclosed herein may be positioned remote from the LED module. In still other embodiments, multiple LED modules may be supplied power from a single driver 70. In some such embodiments each LED module has its own feedback circuit, and sensed overheating of one LED module will trigger its feedback circuit to direct the driver 70 to dim all modules connected to the driver.

In still further embodiments, other types of subcircuits may also be connected to the driver's feedback inputs. For example, other embodiments may employ a current overload subcircuit configured to sense a current overload situation and use the dimming function of the feedback circuit to signal the driver 70 to bring current down to safe levels. Embodiments of such a current overload subcircuit can be as disclosed in the priority application, U.S. Ser. No. 61/758,194, the entirety of which is incorporated by reference into this disclosure.

It is to be understood that the technologies and principles described herein can be applied to other technologies that involve circuitry to adjust the current flowing to an electrical device, and are not necessarily limited to embodiments employing LEDs. Additionally, the technologies and principles described herein that involve a protective cover or housing for an electrical device or reflecting and/or dispersing the light from a light emitting apparatus, are also not necessarily limited to embodiments employing LEDs.

Although inventive subject matter has been disclosed in the context of certain preferred or illustrated embodiments and examples, it will be understood by those skilled in the art that the inventive subject matter extends beyond the specifically disclosed embodiments to other alternative embodiments and/or uses of the invention and obvious modifications and equivalents thereof. In addition, while a number of variations of the disclosed embodiments have been shown and described in detail, other modifications, which are within the scope of the inventive subject matter, will be readily apparent to those of skill in the art based upon this disclosure. It is also contemplated that various combinations or subcombinations of the specific features and aspects of the disclosed embodiments may be made and still fall within the scope of the inventive subject matter. Accordingly, it should be understood that various features and aspects of the disclosed embodiments can be combined with or substituted for one another in order to form varying modes of the disclosed inventive subject matter. Thus, it is intended that the scope of the inventive subject matter herein disclosed should not be limited by the particular disclosed embodiments described above, but should be determined only by a fair reading of the claims that follow.

What is claimed is:

1. A luminaire for indoor use, the luminaire comprising an LED module having a plurality of LEDs, the luminaire configured so that the LEDs of the LED module are positioned to direct light generally downwardly towards a floor, the luminaire comprising an outer housing that is generally concave opening downwardly towards the floor, the luminaire comprising a redirecting member disposed generally below the LED module so that a portion of light from the LEDs impinges on the redirecting member, the redirecting member being disposed within the outer housing, a portion of the outer housing above the redirecting member being translucent, wherein a portion of light from the LEDs is redirected by the redirecting member upwardly toward a ceiling, wherein the portion of the outer housing being interposed between the redirecting member and the ceiling.

2. A luminaire as in claim 1, wherein the redirecting member is ring-shaped and spaced downwardly and radially outwardly from the LED module.

3. A luminaire as in claim 2, wherein the redirecting member is supported independent of the outer housing.

4. A luminaire as in claim 3, wherein the redirecting member is removable independently of the outer housing.

5. A luminaire as in claim 4 additionally comprising a lens interposed between the LEDs and the redirecting member.

6. A luminaire as in claim 2, wherein the ring member has a graphical theme disposed on a side visible from the floor.

7. A luminaire as in claim 6, wherein the downward-facing side of the redirecting member is a different color than the downward-facing side of the outer housing.

8. An LED-based luminaire comprising a circuit board with a power circuit disposed thereon, a plurality of LED packages mounted on the circuit board so as to be powered by the power circuit, a power driver adapted to provide a power flow across the power circuit, the power driver having a feedback input, wherein the power driver is configured to vary the power delivered to the power circuit depending upon a feedback voltage at the feedback input, the circuit board having a feedback circuit connected to the power driver feedback input, at least one thermistor mounted on the circuit board, the feedback circuit comprising a voltage divider comprising the at least one thermistor and a resistor, a shunt regulator being connected between the at least one thermistor and the resistor, wherein the resistance of the at least one thermistor changes as heat in the circuit board changes, and wherein when the thermistor resistance passes a trigger value, the shunt regulator is triggered to change the feedback voltage so as to signal the power driver to change the amount of power delivered across the power circuit.

9. An LED-based luminaire as in claim 8, comprising a plurality of thyristors arranged electrically in series.

10. An LED-based luminaire as in claim 8, wherein the at least one thyristor declines in resistance as the temperature rises, and the shunt regulator reduces the feedback voltage as the thyristor resistance declines beyond a trigger resistance, and wherein decreasing the feedback voltage signals the power driver to decrease power delivery across the power circuit.

11. An LED-based luminaire as in claim 10, wherein the feedback circuit is on board the circuit board, and wherein the feedback circuit is powered by housekeeping power from the power circuit.

12. An LED-based luminaire as in claim 11 additionally comprising a thyristor-based dimmer attached between the feedback circuit and the power driver feedback input so as to enable manual adjustment of the feedback voltage, and wherein the feedback circuit and thyristor-based dimmer are operable separately and simultaneously.

13. An LED-based luminaire as in claim 11, wherein a series-connected plurality of the plurality of LEDs is arranged electrically in series, and the feedback circuit is electrically connected in parallel with a portion of the series-connected plurality of the LEDs so as to provide the housekeeping power.

14. An LED-based lighting system comprising an LED-based luminaire comprising a circuit board with a power circuit disposed thereon, a plurality of LED packages mounted electrically in series on the circuit board so as to be powered by the power circuit, and a power driver adapted to provide a power flow across the power circuit, the power driver having a feedback input, wherein the power driver is configured to vary the power delivered to the power circuit depending upon a feedback voltage at the feedback input, the LED module having an on-board thermal control subcircuit on the circuit board, the thermal control subcircuit electrically in parallel with a portion of the series-connected plurality of LED packages and being adapted to automatically vary the feedback voltage depending on a temperature sensed by the thermal control subcircuit, a manual dimming module interposed between the thermal control subcircuit and the feedback input of the power driver, the manual dimming module configured to allow an operator to manually change the feedback voltage, wherein the thermal control subcircuit is operable independent of the manual dimming module.

15. An LED-based luminaire as in claim 14, wherein the on-board thermal control subcircuit comprises at least one thermistor mounted on the circuit board, a voltage divider comprising the at least one thermistor and a resistor, a shunt regulator being connected between the at least one thermistor and the resistor, the resistance of the at least one thermistor changing as heat in the circuit board changes, and wherein when the thermistor resistance passes a trigger value, the shunt regulator is triggered to change the feedback voltage so as to signal the power driver to change the amount of power flow across the power circuit.

16. An LED-based luminaire as in claim 15, wherein the at least one thyristor declines in resistance as the temperature rises, and the shunt regulator reduces the feedback voltage as the thyristor resistance declines beyond a trigger resistance, and wherein decreasing the feedback voltage signals the power driver to decrease power flow across the power circuit.

17. An LED-based luminaire as in claim 14, wherein the manual dimming module comprises a thyristor-based dimmer.

* * * * *